United States Patent [19]

Brennan

[11] 3,900,626

[45] Aug. 19, 1975

[54] TANTALUM WIRE REINFORCED SILICON NITRIDE ARTICLES AND METHOD FOR MAKING THE SAME

[75] Inventor: John J. Brennan, Portland, Conn.

[73] Assignee: United Aircraft Corporation, East Hartford, Conn.

[22] Filed: Sept. 4, 1973

[21] Appl. No.: 394,432

[52] U.S. Cl. ............... 428/110; 29/191.6; 156/166; 156/180; 252/477 R; 264/60; 428/114; 428/294; 428/902
[51] Int. Cl. ............................................. B32b 5/02
[58] Field of Search ............ 161/60, 143, 170, 207; 264/56, 60; 29/191.4, 191.2, 191.61; 252/477 R; 117/128, 66, 62.2; 156/166, 180, 181

[56] References Cited
UNITED STATES PATENTS 3,427,185  2/1969  Cheatham et al.................... 117/128

3,766,000  10/1973  Gibson et al........................ 161/170

FOREIGN PATENTS OR APPLICATIONS

| 1,646,666 | 1/1972 | Germany ............................... 264/56 |
| 2,010,322 | 2/1970 | France.................................. 264/56 |
| 41-10337 | 1966 | Japan.................................... 264/60 |
| 954,285 | 2/1964 | United Kingdom.................. 264/60 |
| 331,047 | 6/1970 | U.S.S.R............................... 264/60 |

Primary Examiner—George F. Lesmes
Assistant Examiner—Stanley S. Silverman
Attorney, Agent, or Firm—John D. Del Ponti

[57] ABSTRACT

A reinforced ceramic article comprises a matrix material of $Si_3N_4$ with reinforcing filaments of tantalum. The article has excellent impact strength over a wide range of temperatures. A method for making the article is also disclosed.

2 Claims, 1 Drawing Figure

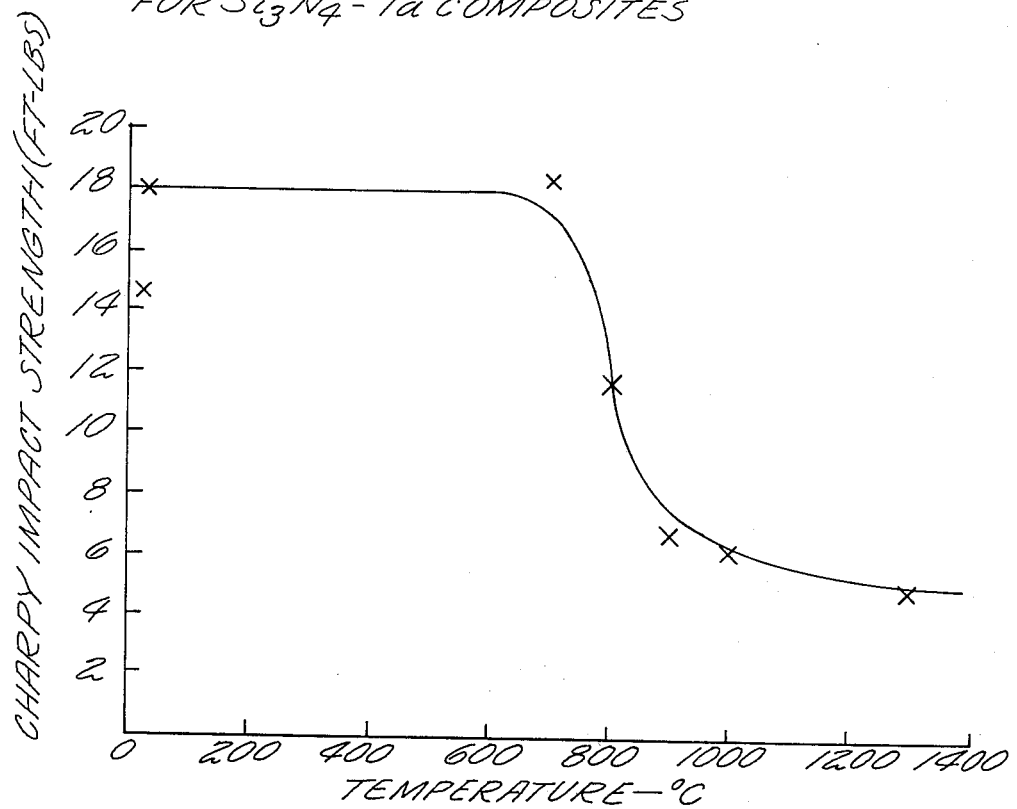

TANTALUM WIRE REINFORCED SILICON NITRIDE ARTICLES AND METHOD FOR MAKING THE SAME

This invention was conceived or reduced to practice under a contract or subcontract with the Department of the Navy.

BACKGROUND OF THE INVENTION

1. Field of the Invention

This invention relates to fiber-reinforced ceramic matrix composites.

2. Description of the Prior Art

Ceramic materials, by virtue of their high melting points and oxidation resistance, can offer large gains in gas turbine performance, provided some serious limitations can be overcome. These limitations are poor thermal shock resistance and, more critically, low impact strength. It is recognized in the prior art that ceramic matrices reinforced with filaments of various materials may have good impact strength. For example, U.S. Pat. No. 3,386,840 to Gruber suggests that fibers of silicon-carbide varying in length from about 250 Angstroms to 1 inch maximum, may be used to improve the strength of refractory metals such as nitrides. In column 8 example 7, Gruber indicates that sillimanite ($Al_2O_3 \cdot SiO_2$) containing 10 percent of these relatively short fibers of silicon-carbide was found to have a greater impact strength than the ordinary sillimanite without this additive. Cheatham et al, U.S. Pat. No. 3,427,185 suggests forming a composite structural material by plasma arc spraying or vapor depositing the matrix material over a mat of filamentary material. In column 6 he lists a large number of filamentary materials, such as tungsten, and matrix materials, including some ceramics, which he suggests may be combined in the manner of his invention; however, his only example is that of using high carbon steel wires in a matrix of aluminum. It cannot be determined from the patent whether any other combinations were tried and what results were obtained.

One fiber-reinforced ceramic material which may be suitable for use in a gas turbine engine environment is silicon nitride reinforced with tungsten wires as described in copending U.S. Pat. Application Ser. No. 394,433 entitled, "Tungsten Wire Reinforced Silicon Nitride Articles and Method For Making the Same" by J. Brennan, R. Novak and M. DeCrescente, filed on even date herewith and of common assignee with the present application. Although this material has considerably improved properties over the prior art at high temperatures, as stated therein its impact strength at room temperature is about the same as unreinforced silicon nitride. This, of course, is not desirable. This is common in the prior art ceramic composite systems.

The mode of failure of a blade or a vane in a gas turbine engine is also important. If, for example, the blade or vane breaks into two pieces, these pieces will travel through the engine and may cause considerable damage in other locations. A failure of this type is to be avoided if possible, but happens to be the most common type of failure in ceramic composite systems.

Thus, despite the various combinations of matrices, including ceramic matrices and fiber reinforcements discussed in the prior art, none to date have proven entirely satisfactory for use in gas turbine engines, and more particularly for use as blades or vanes in gas turbine engines.

SUMMARY OF THE INVENTION

An object of the present invention is a fiber-reinforced ceramic matrix composite material suitable for use in a gas turbine engine.

Another object of the present invention is a fiberreinforced ceramic matrix composite having a relatively high impact strength. A further object of the present invention is a fiber-reinforced ceramic matrix composite article suitable for use as a blade or vane in a gas turbine engine and which fails in a manner which is unlikely to cause significant further damage to other components of the engine.

Accordingly, the present invention is a fiber-reinforced ceramic article comprising densified hot-pressed silicon nitride ($Si_3N_4$) reinforced with continuous filaments of tantalum (Ta).

It has been found by Charpy impact testing that this material is able to absorb many times the energy of unreinforced hot pressed silicon nitride at both room temperatures and at gas turbine engine operating temperatures.

The selection of a suitable ceramic matrix material for use, for example, as a high temperature fiber-reinforced composite gas turbine engine vane, depends upon a number of factors. Among these are: ease of fabrication, strength at elevated and room temperatures, oxidation and corrosion resistance, thermal shock resistance, creep strength, and impact resistance. Many ceramic materials meet the criteria of strength and oxidation resistance at the temperature of interest, which in our case is about 2400°F, but do not have good thermal shock resistance. The refractory oxides fall in this category. For example, zirconium diboride and silicon carbide are strong and oxidation resistant materials. Zirconium diboride, however, does not possess very good thermal shock resistance and also requires temperatures on the order of 2100°C for fabrication, which for a number of reasons is much too high for successful incorporation of reinforcing fibers, as will be further discussed. Silicon carbide must also be hot pressed above 2000°C for complete densification and has been found to completely react with fibrous additions of W, $B_4C$ and $Al_2O_3$ under these conditions. Silicon nitride, on the other hand, does not have these drawbacks and has been found to be an excellent ceramic matrix material when reinforced with tungsten wires and more particularly when reinforced with tantalum wires.

Many reinforcing fibers were considered for use with the silicon nitride matrix, however, of those initially considered none were found satisfactory except tungsten. For example, it is desirable that the coefficient of thermal expansion of a filament used in reinforcing a ceramic matrix be greater than that of the matrix so that on cooling from the fabrication temperature the ceramic matrix is put into a compressive prestress. Thus, when $Al_2O_3$ fibers are used in a silicon nitride matrix, their very high coefficient of thermal expansion results in extremely large prestresses in the fibers such that tensile failures occur on cooling from the fabrication temperature. For this reason $Al_2O_3$ fibers are not acceptable. In this regard, silicon carbide fibers (SiC) were successful in putting a compressive prestress in the ceramic matrix; however, during the hot pressing operation at 1,650°C a reaction took place within the fiber, between its tungsten core and the silicon carbide, forming tungsten silicide which reduced the ultimate tensile strength of the reinforcing silicon carbide fiber to below acceptable levels making it useless for the applications under consideration.

Attempts were made to hot press the silicon nitride + MgO at lower temperatures to avoid the undesirable reactions which take place with various types of reinforcing filaments. However, with MgO as the densification aid, satisfactory densification does not occur below 1600°C. Other satisfactory densification aids could not be found.

Attempts were also made to find coatings for the filaments which would prevent or reduce unfavorable reactions at the high hot pressing temperatures, but all such attempts were unsuccessful for one reason or another.

As hereinabove indicated, of those fibers initially considered for use with the silicon nitride matrix, only tungsten was found to be satisfactory. Tantalum was not considered initially as a possible candidate due to low tensile strengths, both at room temperature and especially at elevated temperatures; however, it was subsequently discovered that the notch sensitivity of tantalum was very low. This fact prompted the production of several test specimens of silicon nitride reinforced with tantalum with the hopes that the low notch sensitivity would compensate for the low tensile strengths. The results of the tests were surprising in that silicon nitride reinforced with tantalum wire increased the impact strength of unreinforced silicon nitride by a factor of 36 at room temperature and by a factor of 10 at 1300°C.

The foregoing and other objects, features and advantages of the present invention will become more apparent in the light of the following detailed description of preferred embodiments thereof as illustrated in the accompanying drawing.

Brief Description of the Drawing

FIG. 1 is a graph of the Charpy impact strength versus temperature for tantalum reinforced silicon nitride composites.

DESCRIPTION OF THE PREFERRED EMBODIMENTS

In one embodiment of the present invention, the composite structure is produced from alternate layers of $Si_3N_4$ plus 5 wf% MgO powders and 25 mil diameter Ta wires. The wires are arranged such that the final volume percent reinforcement is 25%. These layers are laid up in a graphite die, and then hot-pressed at 1675°C for 30 minutes in an argon atmosphere. The resulting structure of this preferred embodiment approached full densification. Care is taken to assure that the finished article does not have any exposed tantalum wires. This is mandatory in the corrosive environment of a gas turbine engine.

In this preferred embodiment tantalum wires in each layers are continuous and parallel and the wires within adjacent layers are parallel to each other; however, very satisfactory results may be obtained by having the wires of adjacent layers at an angle with respect to each other to form a diamond-shaped pattern.

FIG. 1 shows the results of a series of Charpy impact tests done at various temperatures from room temperature to 1300°C on specimens of this preferred embodiment. It can be seen that the Charpy impact strength is about 18 foot pounds from room temperature to approximately 700°C, at which point it falls gradually to five foot pounds at 1300°C. In contrast, unreinforced hot pressed $Si_3N_4$ plus 5% MgO has a Charpy impact strength of approximately 0.5 foot pounds from room temperature to 1300°C. Satisfactory test specimens were also made using tantalum wires having diameters ranging from 10 mils to 187 mils (3/16 inch). However, it is by no means intended to limit the present invention to within this range. It is also expected that satisfactory results may be obtained with a wide variety of volume percents of tantalum wires within the composite article.

The unusually high impact strength is attributed to the mode of fracture of the composite. The mode of fracture is not only important in that it is related to the amount of energy absorbed during impact, but it is particularly important when the composite is used as a gas turbine vane material. The worst possible situation is when, upon impact, the ceramic vane breaks into two or so relatively large pieces which proceed to impact into other stages of vanes and blades further downstream in the engine causing catastrophic failure. This type of fracture is likely to occur in unreinforced ceramics. The next best situation is when the mechanism of breakage is by means of fiber pullout wherein in certain composite systems, fibers fracture away from the plane of an advancing crack due to the presence of flaws, then subsequently pull out of the matrix as the crack progresses. Large amounts of energy are absorbed by this mechanism and smaller impacting particles may not fail the composite; however, large particles will still cause the composite to break into large pieces again causing catastrophic failure of a gas turbine engine.

The next best situation is that, upon impact, the mechanism of ductile fiber fracture occurs. Composites that contain extremely ductile wires can absorb energy on impact due to local heavy deformation of the wires at the fracture surface. A higher impact energy (i.e. particle size or velocity) would thus be necessary to completely fail the vane and if the fiber is elongated at the fracture surface but did not break, the vane might hold together for a sufficient time for the engine to be shut down.

The best situation, excluding the ideal situation where there is no damage to the vane upon impact, is the combination of ductile fiber deformation and interfacial splitting occurring upon impact. This may occur in composites given a relatively weak interface or bond between the matrix and the fiber (about 1/5 the strength of the fiber). The occurrence of interfacial splitting results in the blunting of cracks which propagate in the matrix, and could lead to notch insensitivity in the material. The crack follows the length of the fiber and the matrix breaks up into many small pieces. Large amounts of energy are absorbed by this deformation and mode of failure in that one has to take into account the contributions of the energy used to bend the wires but not to break them, the energy absorbed in creating the surfaces formed during interfacial splitting, and the energy absorbed in fracturing the matrix into the thousands of small pieces that are created. The resulting small fragments breaking off would not be likely to cause any subsequent damage to a gas turbine engine and the engine could continue to operate.

These differing modes of failure help to explain the sudden drop in impact strength shown to occur in FIG.

1 at around 700°C in the tantalum reinforced silicon nitride composite. From room temperature to 700°C the mode of fracture is a combination of ductile fiber elongation plus interfacial splitting which is very desirable, as has been discussed. Above 700°C the mode of fracture changes to one of ductile fiber fracture. This mode of fracture is not as desirable as interfacial splitting even though the fracture energy is quite high. It is probably caused by a loss in strength of the tantalum wires at elevated temperatures. Tantalum alloy wires having significantly higher strength than those used for the manufacture of the test specimen are available and may extend the interfacial splitting mode to temperatures well above 700°C. It is interesting to note that the composite structure of the preferred embodiment has a high threshold damage level wherein the specimens are able to absorb about 3 foot pounds of energy without incurring any damage whatsoever.

In the case of tantalum reinforced silicon nitride, a layer of tantalum silicide forms between the wires and the matrix material during hot-pressing which chemically bonds the wires to the matrix. But unlike other wires, such as tungsten, this bond is apparently quite weak. The mechanism of interfacial splitting is dependent upon a very low interfacial shear strength between the wires and the matrix, and it is this low shear strength between the tantalum and the silicon nitride that is felt to account for the interfacial splitting with its attendant advantages. It is important to note that the initial specimens of tantalum reinforced silicon nitride were hot pressed for 1 hour rather than for the 30 minutes of the preferred embodiment. Charpy impact testing at room temperature on one of these specimens resulted in an impact strength of only 3.8 foot pounds, as compared with the approximately 18 foot pounds for the preferred embodiment as shown in FIG. 1. The mode of fracture with this initial specimen at room temperature was that of fiber pullout rather than the combination of ductile fiber elongation plus interfacial splitting which occurred in the specimens of the preferred embodiment. It is felt that this is the result of increased interfacial shear strength between the tantalum and the silicon nitride due to the extended length of time of the hot pressing operation.

Although the invention has been shown and described with respect to preferred embodiments thereof, it should be understood by those skilled in the art that various changes and omissions in the form and detail thereof may be made therein without departing from the spirit and scope of the invention.

Having thus described typical embodiments of our invention, that which we claim as new and desire to secure by Letters Patent of the United States is:

1. An impact resistant fiber-reinforced composite article suitable for use in a gas turbine engine environment comprising a plurality of continuous tantalum wires preferentially oriented and completely embedded in a hot-pressed, $Si_3N_4$ matrix which approaches full densification, each of said wires having a layer of tantalum silicide thereon, said tantalum silicide layer being chemically bonded to said wires and said matrix, said composite article exhibiting, as a mode of breakage as a result of Charpy impact tests, either a combination of ductile fiber elongation plus interfacial splitting or ductile fiber fracture.

2. The fiber-reinforced composite article according to claim 1 wherein said matrix includes MgO as a densification agent.

* * * * *